Oct. 20, 1953  M. C. LAND ET AL  2,655,824
FRUIT JAR AND THE LIKE HOLDER
Filed Sept. 17, 1951  2 Sheets-Sheet 1

Marion C. Land and
Mignon Kimbell
INVENTORS
BY Chas. Denegre
Attorney.

Oct. 20, 1953   M. C. LAND ET AL   2,655,824
FRUIT JAR AND THE LIKE HOLDER

Filed Sept. 17, 1951    2 Sheets-Sheet 2

Marion C. Land and
Mignon Kimbell
INVENTORS

BY Chas. Denegre
Attorney.

Patented Oct. 20, 1953

2,655,824

UNITED STATES PATENT OFFICE 2,655,824

FRUIT JAR AND THE LIKE HOLDER

Marion C. Land and Mignon Kimbell, Birmingham, Ala.

Application September 17, 1951, Serial No. 247,002

1 Claim. (Cl. 81—3.43)

This invention relates to a fruit jar and the like holder, especially intended for holding a hot jar while tightening a lid thereon after it has been filled with hot fruit or vegetables. It has for its main objects to provide such a device that will be highly satisfactory for its purpose, simple in structure, cheap to manufacture, easy to use, and extremely durable. At the present time in the home preserving of fruits and vegetables that must be packed while hot, the operator generally holds the jar by hand with a rag while tightening a lid thereon. The present device will make such work easy and simple.

Other objects and advantages will appear from the drawings and description.

Figure 1:
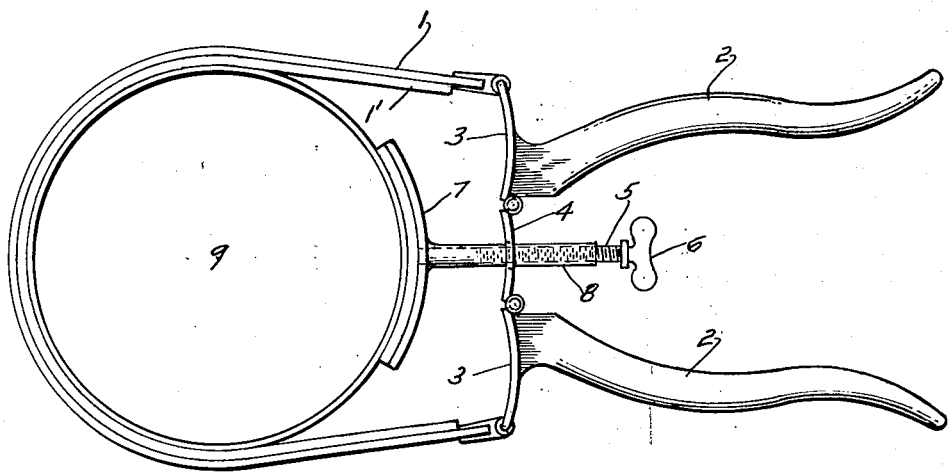
Figure 2:
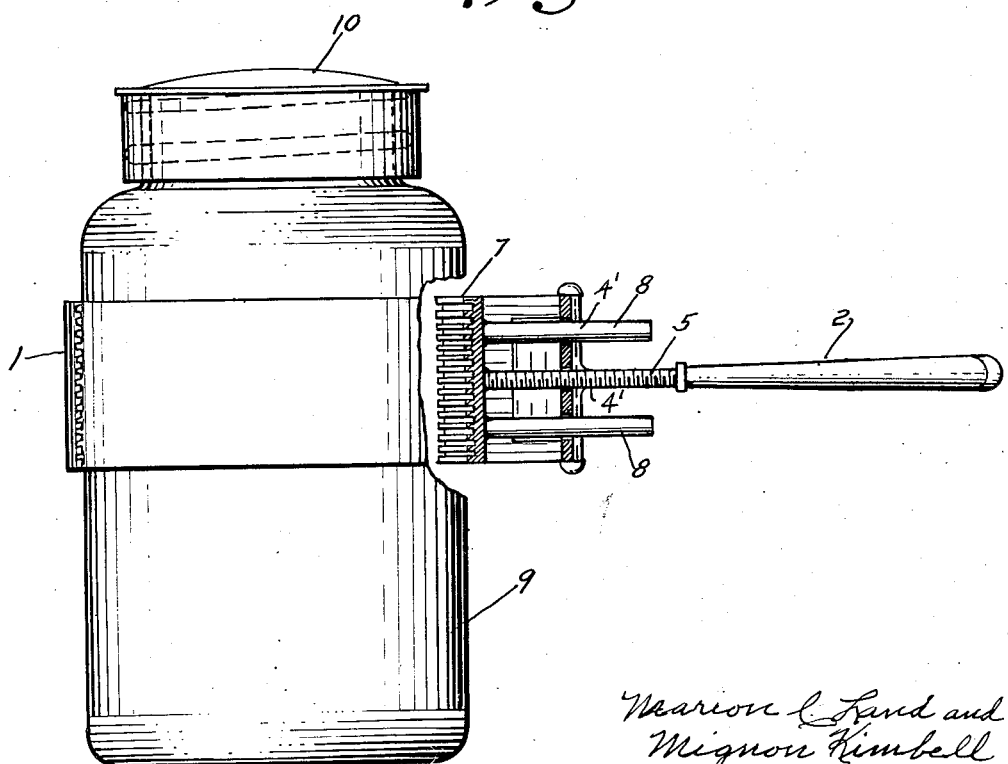
Figure 3:
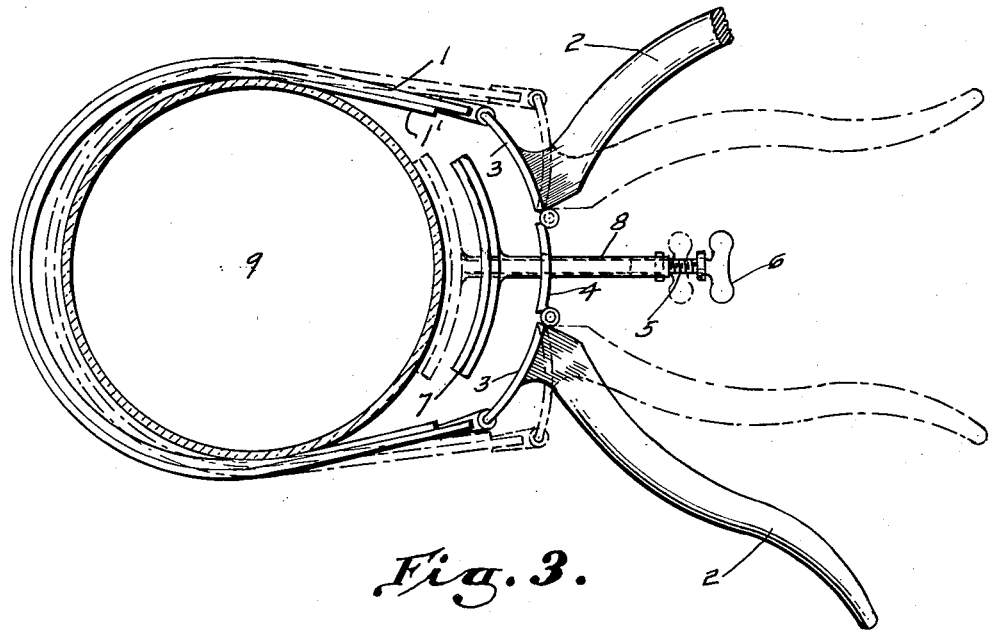
Figure 4:
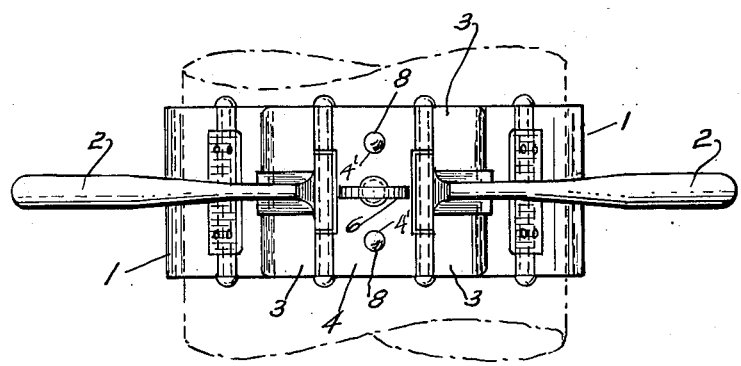

By referring generally to the drawings, a part of this application, it will be observed that Fig. 1 is a plan view of the holder according to the present invention with a jar indicated by a section thereof being in position for holding; Fig. 2 is a side elevational view, partly cut away, showing the holder with a jar therein; Fig. 3 is a plan view of the holder in expanded position in full lines and contracted position in broken lines with a jar section indicated therein; and Fig. 4 is a detail view of the mechanism of the holder with part of a jar in broken lines indicated therein.

Similar reference numerals refer to similar parts throughout the several views.

Referring to the drawings in detail it will be seen that the holder comprises a flexible band 1 preferably made of canvas and an inner lining 1' of rubber. Two hand handles 2 have integral plate parts 3 hinged to plate 4 and the ends of the band. A bolt 5 with an integral wing 6 is attached with its end revolvable in the band segment 7. Two guide rods 8 are attached by one end of each to the band segment and are slidable in holes 4' in plate 4. In use a jar 9 is positioned within the band 1 for holding while the lid 10 is set up tight.

From the above it will appear that in order to use the holder a jar is first placed within the band with the jar resting on a flat surface, then the hot article is placed within the jar, then the operator clamps the segment plate against the jar by bringing the two handles toward each other. While the jar with hot contents is so held by one hand of the operator the other hand is used to screw the lid onto the jar. The segment plate is adjustable inward and outward by turning the winged bolt which travels by its threads in the center hole of the hinged center plate while the end of the bolt revolves in the segment plate. This provides for use of the holder within the limits of the movement of the segment plate and the inner circumference of the band.

The various parts of the holder may be made of any material suitable for the purpose. Also the holder may be made in different sizes and capacities, depending on the size of the jars or other articles on which to be used. The invention resides in the arrangement and combination of the parts, not the material of which they are made.

While we have shown and described the preferred embodiment of our invention, we do not wish to limit same to the exact and precise details of structure, but reserve the right to make all modifications and changes so long as they remain within the scope of the invention and the following claim.

Having described our invention we claim:

A fruit jar holder of the character described comprising a flexible band in shape defining part of a circle, said band having a non-stretchable outer portion and a rubber lining thereto attached, a center metal plate, two metal handles adapted for manual operation thereof, each of said handles having an integral end plate-shaped portion positioned at a 90 degree angle compared to the major axis of the other part of the handle, the inner edges of said handle plates being hinged to said center plate, the other outer ends of said handle plates being hinged to the ends of said flexible band; a curve-shaped plate, a bolt with screw-threads in the face of its length, one end of said bolt mounted revolvably in the center of said curved plate, said center metal plate having a screw-threaded hole through its center, said bolt mounted revolvably in said threaded hole, a wing-shaped nut integral on the outer end of said bolt, two similar rods, one end of each rod attached fixed to said curved plate, said center plate having two plain holes therethrough, said plain holes being in line with said threaded hole in the same plate, said two rods mounted slidable through said plain holes.

MARION C. LAND.
MIGNON KIMBELL.

References Cited in the file of this patent

UNITED STATES PATENTS

| Number | Name | Date |
|---|---|---|
| 1,399,885 | Ryan | Dec. 13, 1921 |
| 1,934,118 | Draper | Nov. 7, 1933 |